(12) United States Patent  
Cui (10) Patent No.: US 12,476,123 B2  
(45) Date of Patent: Nov. 18, 2025

(54) METHOD AND APPARATUS FOR MATERIAL DISPATCHING, AND VERTICAL FURNACE APPARATUS

(71) Applicant: BEIJING NAURA MICROELECTRONICS EQUIPMENT CO., LTD., Beijing (CN)

(72) Inventor: Lin Cui, Beijing (CN)

(73) Assignee: BEIJING NAURA MICROELECTRONICS EQUIPMENT CO., LTD., Beijing (CN)

( * ) Notice: Subject to any disclaimer, the term of this patent is extended or adjusted under 35 U.S.C. 154(b) by 1341 days.

(21) Appl. No.: 17/144,987

(22) PCT Filed: Jul. 1, 2019

(86) PCT No.: PCT/CN2019/094256  
§ 371 (c)(1),  
(2) Date: Aug. 12, 2021

(87) PCT Pub. No.: WO2020/015521  
PCT Pub. Date: Jan. 23, 2020

(65) Prior Publication Data  
US 2021/0374625 A1 Dec. 2, 2021

(30) Foreign Application Priority Data  
Jul. 19, 2018 (CN) .......................... 201810800090.0

(51) Int. Cl.  
*H01L 21/67* (2006.01)

(52) U.S. Cl.  
CPC .............................. *H01L 21/67276* (2013.01)

(58) Field of Classification Search  
CPC ............ H01L 21/67276; G06Q 10/047; G06Q 10/06316; G06Q 50/04; G06Q 10/06313; Y02P 90/30  
See application file for complete search history.

(56) References Cited

U.S. PATENT DOCUMENTS 8,295,965 B2 * 10/2012 Wu .................. G05B 19/41865  
                                                               700/121  
10,073,444 B2 * 9/2018 Wu ..................... G05B 19/4187  
(Continued)

FOREIGN PATENT DOCUMENTS

| CN | 101459098 A | 6/2009 | |
|---|---|---|---|
| CN | 101763098 A * | 6/2010 | .............. Y02P 90/02 |

(Continued)

OTHER PUBLICATIONS

World Intellectual Property Organization (WIPO) International Search Report for PCT/CN2019/094256 Sep. 30, 2019 6 Pages (including translation).

*Primary Examiner* — Mohammed Shamsuzzaman  
(74) *Attorney, Agent, or Firm* — ANOVA LAW GROUP, PLLC (57) ABSTRACT

A method for dispatching a material includes obtaining a material listing and a process sequence, inquiring about each material in the material listing to determine a current status of each material, according to the current status of each material and the process sequence, simulating and calculating a plurality of moving paths for materials in the material listing and recording process time efficiencies of the plurality of moving paths, using a moving path with a highest process time efficiency among the plurality of moving paths as a selected moving path and storing the selected moving path in a dispatching queue, and performing a dispatching on the materials, according to the selected moving path in the (Continued)

dispatching queue. Each moving path includes a collection of moving sequences of materials in the moving path on a line of time.

7 Claims, 6 Drawing Sheets

(56) References Cited

U.S. PATENT DOCUMENTS

| | | | |
|---|---|---|---|
| 10,295,979 B2* | 5/2019 | Norman | G05B 19/41865 |
| 10,359,769 B2* | 7/2019 | Emani | H01L 21/67167 |
| 10,685,260 B1* | 6/2020 | Adelaar | G06F 18/2148 |
| 2008/0091301 A1* | 4/2008 | Brantmark | G05B 19/41825 |
| | | | 700/245 |
| 2008/0106286 A1* | 5/2008 | Pirkle | G01R 31/2886 |
| | | | 324/750.16 |
| 2011/0060441 A1* | 3/2011 | Ko | G05B 19/41885 |
| | | | 700/100 |
| 2024/0085891 A1* | 3/2024 | Choi | G05B 19/41875 |

FOREIGN PATENT DOCUMENTS

| | | | | |
|---|---|---|---|---|
| CN | 105446343 A | | 3/2016 | |
| CN | 106356325 A | | 1/2017 | |
| CN | 106371408 A | | 2/2017 | |
| CN | 106413997 A | | 2/2017 | |
| CN | 109034596 A | * | 12/2018 | ....... H01L 21/67276 |
| JP | 2003197711 A | | 7/2003 | |
| JP | 2014176910 A | | 9/2014 | |
| TW | I256372 B | | 6/2006 | |
| WO | WO-2006057591 A1 | * | 6/2006 | ....... G05B 17/41825 |
| WO | WO-2024088294 A1 | * | 5/2024 | ............. G06F 11/22 |

\* cited by examiner

METHOD AND APPARATUS FOR MATERIAL DISPATCHING, AND VERTICAL FURNACE APPARATUS

CROSS-REFERENCE TO RELATED APPLICATIONS

This application is a continuation of International Application No. PCT/CN2019/094256, filed Jul. 1, 2019, which claims priority to Chinese Application No. 201810800090.0 filed Jul. 19, 2018, the entire contents of all of which are incorporated herein by their reference.

TECHNICAL FIELD

The present disclosure generally relates to the process data processing technology field and, more particularly, to method and apparatus for material dispatching and vertical furnace apparatus in the semiconductor production industry.

BACKGROUND

With the development of the semiconductor industry, a semiconductor process production line is required to have characteristics of better quality, lower manufacturing cost, fast response, and more flexibility. Those characteristics may affect yield and response capability of semiconductor production. Production planning and dispatching systems may help semiconductor manufacturers to achieve these characteristics to a certain degree.

The dispatching system is an important link to realize production management of a semiconductor manufacturer, which is an indispensable part of realizing enterprise informatization. There is still a need to provide a method and apparatus for material dispatching and a vertical furnace apparatus, e.g., for a wafer processing process in the semiconductor production industry.

SUMMARY

Embodiments of the present disclosure provide a method for dispatching a material. The method includes obtaining a material listing and a process sequence, inquiring about each material in the material listing to determine a current status of each material, according to the current status of each material and the process sequence, simulating and calculating a plurality of moving paths for materials in the material listing and recording process time efficiencies of the plurality of moving paths, using a moving path with a highest process time efficiency among the plurality of moving paths as a selected moving path and storing the selected moving path in a dispatching queue, and performing a dispatching on the materials, according to the selected moving path in the dispatching queue. Each moving path includes a collection of moving sequences of materials in the moving path on a line of time.

Embodiments of the present disclosure provide an apparatus for material dispatching, including a data acquisition circuit, a status determination circuit, a simulation and calculation circuit, an evaluation circuit, a storage circuit, and a dispatching circuit. The data acquisition circuit is configured to obtain a material listing and a process sequence. The status determination circuit is configured to inquire about each material in the material listing to determine a current status of each material. The simulation and calculation circuit is configured to, according to the current status of each material and the process sequence, simulate and calculate a plurality of moving paths of materials in the material listing and record process time efficiencies of the plurality of moving paths. Each moving path includes a collection of moving sequences of materials in the moving path on a line of time. The evaluation circuit is configured to using a moving path with a highest process time efficiency among the plurality of moving paths as a selected moving path. The storage circuit is configured to store the material listing and the process sequence and save the selected moving path in a dispatching queue. The dispatching circuit is configured to dispatch the materials according to the selected moving path in the dispatching queue.

Embodiments of the present disclosure provide a vertical furnace apparatus including an apparatus for material dispatching. The apparatus for material dispatching includes a data acquisition circuit, a status determination circuit, a simulation and calculation circuit, an evaluation circuit, a storage circuit, and a dispatching circuit. The data acquisition circuit is configured to obtain a material listing and a process sequence. The status determination circuit is configured to inquire about each material in the material listing to determine a current status of each material. The simulation and calculation circuit is configured to, according to the current status of each material and the process sequence, simulate and calculate a plurality of moving paths of materials in the material listing and record process time efficiencies of the plurality of moving paths. Each moving path includes a collection of moving sequences of materials in the moving path on a line of time. The evaluation circuit is configured to using a moving path with a highest process time efficiency among the plurality of moving paths as a selected moving path. The storage circuit is configured to store the material listing and the process sequence and save the selected moving path in a dispatching queue. The dispatching circuit is configured to dispatch the materials according to the selected moving path in the dispatching queue.

DETAILED DESCRIPTION OF THE EMBODIMENTS

Embodiments of the present disclosure are described in detail below. The details of embodiments of the present disclosure are used to help with better understanding. Embodiments of the disclosure described are exemplary. Therefore, those of skill in the art may make various modifications or changes to embodiments described in the specification, and those modifications or changes do not depart from the scope and spirit of the present disclosure.

Terms used in the present disclosure are merely used to describe specific embodiments but are not intended to limit the present disclosure. The singular forms of "a," "a kind," and "the" used in the present disclosure also include plural forms of "a plurality of" and "variety" unless the context is otherwise specified. The terms "include" and "contain" illustrate the features, steps, operations, and/or existence of components. However, those terms do not exclude the presence or addition of one or more other features, steps, operations, or components.

All terms used in embodiments of the present disclosure (including technical and scientific terms) have same meanings as commonly understood by those skilled in the art of the present disclosure. The terms used here should be interpreted as having meaning consistent with the context of this specification and should not be interpreted in an idealized or overly rigid manner.

Figure 1:
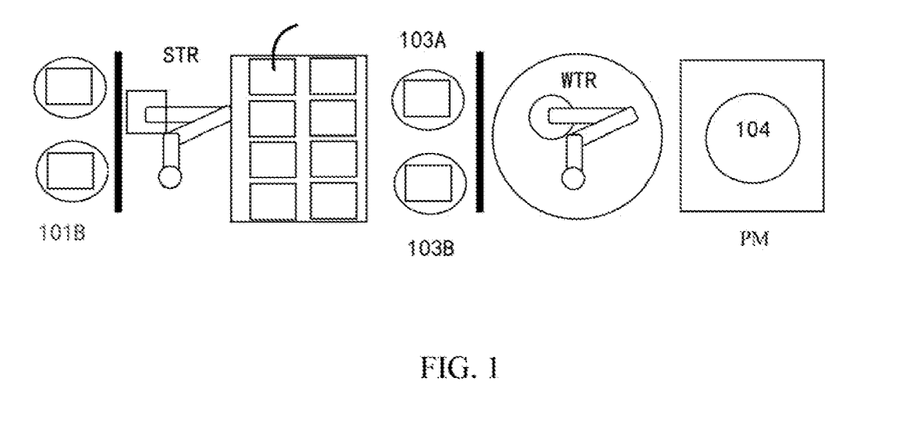
FIG. 1 is a schematic diagram of an exemplary vertical furnace apparatus according to some embodiments of the present disclosure.

FIG. 1 is a schematic diagram of a vertical furnace apparatus related to a method of material dispatching according to some embodiments of the present disclosure. As shown in FIG. 1, the vertical furnace apparatus includes two loading terminals 101A and 101B. The two loading terminals 101A and 101B may be configured to place a wafer transfer box. One wafer transfer box includes a plurality of slots (e.g., 25 slots) configured to store wafers. The two loading ports 101A and 101B both include a door opening mechanism configured to open the door of the transfer box.

The vertical furnace apparatus also includes a wafer transfer box robot (STR). The STR may be configured to transfer the wafer transfer box, and the STR may include a function for scanning the wafer transfer box. During a scanning process, the door of the wafer transfer box may need to be opened and kept still. The STR may include an infrared probe. Storage information of the wafers in the wafer transfer box, for example, a number of the wafers stored in the wafer transfer box, may be obtained by moving the STR up and down. The STR may transfer the wafer transfer box from the loading terminal 101A or 101B to a stocker 102 and place the wafer transfer box on a shelf 105 of the stocker 102. Similarly, the STR may transfer the wafer transfer box located on the shelf 105 of the stocker 102 back to the loading terminal 101A or 101B. In addition, the STR may transfer the wafer transfer box placed on the shelf 105 of the stocker 102 into a load lock chamber 103A or 103B. Similarly, the STR may transfer the wafer transfer box placed in the load lock chamber 103A or 103 B back to the shelf 105 of the stocker 102.

A stocker 102 may include a plurality of wafer transfer boxes (e.g., 16 wafer transfer boxes). Two load lock chambers 103A and 103B may include pre-vacuumed lock chambers, which are configured as a bridge for the wafer to enter a process chamber. The load lock chambers 103A and 103B may also include a door opening mechanism configured to open the door of the wafer transfer box.

The vertical furnace apparatus may further include a wafer robot (WTR). The WTR is configured to transfer the wafers and also includes a scanning function. The WTR may be configured to perform scanning on the wafer transfer boxes in the load lock chambers 103A and 103B and a boat in the process chamber (PM). The doors of the wafer transfer boxes in the load lock chambers 103A and 103B must be kept open and still during the scanning process, and the boat may be at a start position during the scanning process. The WTR may include an infrared probe. The storage information of the wafers in the wafer transfer box and information of the wafers on the boat may be obtained by moving the WTR up and down, for example, a number of the wafers. The WTR may transfer the wafers from the wafer transfer box in the load lock chamber 103A or 103B to the boat in the PM. The WRT may also transfer the wafer from the boat in the PM to the wafer transfer box in the load lock chamber 103A or 103B.

The WTR includes a mechanical hand. The mechanical hand may include one or more fingers. One finger may transport one wafer each time. With more fingers, the mechanical hand may transport a plurality of wafers at one time. For example, with 5 fingers, the mechanical hand may transport a maximum of 5 wafers each time. For the mechanical hand with multiple fingers, a number of wafers transported by the WTR in a single time may be adjusted according to specific needs. For example, for the mechanical hand with 5 fingers, the number of wafers transported by the WTR may range from 1 to 5 each time.

The PM is configured for corresponding process operations. The boat in the PM may include wafer placement slots for placing the wafers. The number of the wafer placement slots may determine the number of wafers that participate in the process simultaneously each time in the PM. At present, the number of the wafer placement slots may include 25 and 41 two formats.

The above description only provides an example of the vertical furnace apparatus. Various components, such as the load terminal, the stocker, the load lock chamber, the STR, the WTR, the PM, and the boat, may be set as needed.

Figure 2:
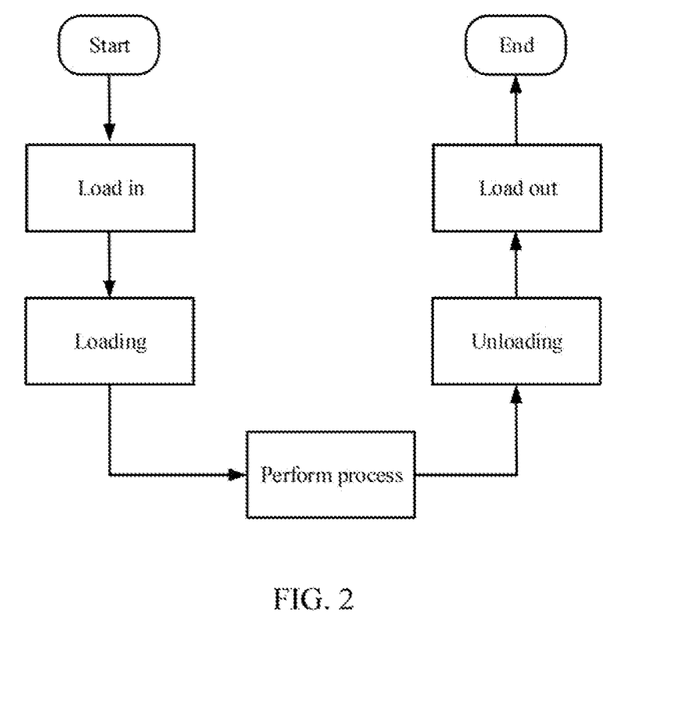
FIG. 2 is a schematic diagram showing a material transfer process applied to a vertical furnace apparatus according to some embodiments of the present disclosure.

FIG. 2 is a schematic diagram showing a material transfer process applied to the vertical furnace apparatus according to some embodiments of the present disclosure. As shown in FIG. 2, after the process starts, the wafer transfer box containing the wafers is loaded into the stocker from the load terminal and placed in the load lock chamber via the stocker. The wafers in the wafer transfer box are loaded on the boat in the PM. The production process is performed in the process chamber. After the process is over, the processed wafers are unloaded from the boat placed in the process chamber into the wafer transfer box in the load lock chamber. The wafer transfer box containing the processed wafers is loaded out to the loading terminal through the stocker. As such, the process is ended.

Figure 3:
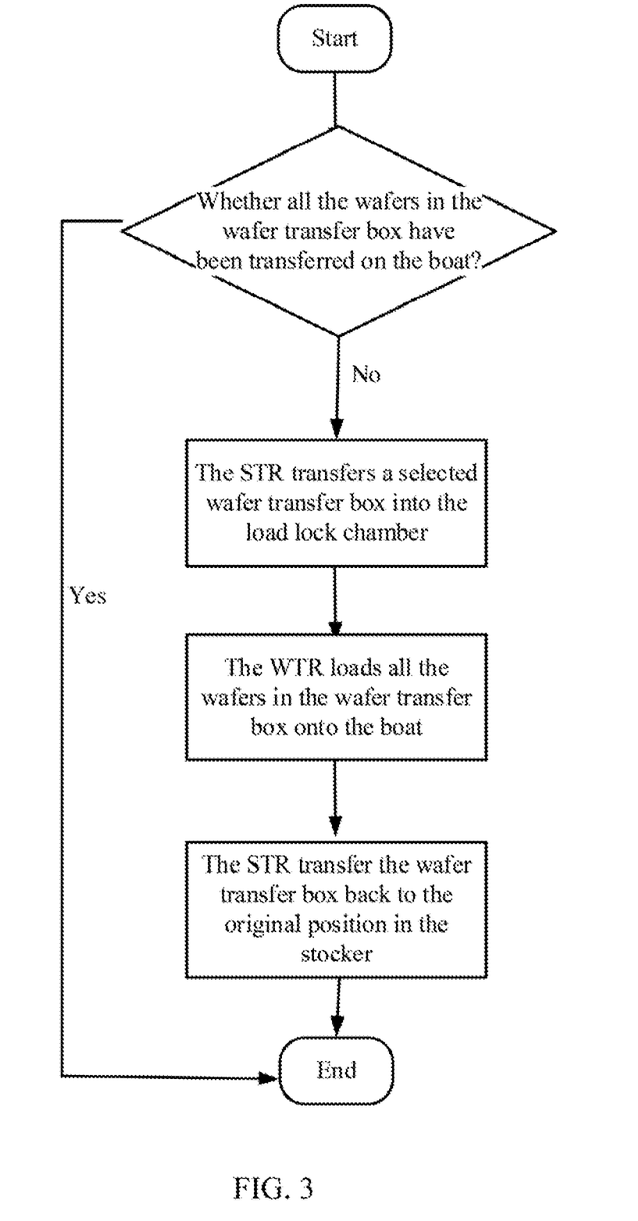
FIG. 3 is a schematic diagram showing a material loading process applied to a vertical furnace apparatus according to some embodiments of the present disclosure.

FIG. 3 is a schematic diagram showing a material loading process applied to the vertical furnace apparatus according to some embodiments of the present disclosure. After the process starts, whether all the wafers in the wafer transfer box have been transferred to the boat is determined. If all the wafers in the wafer transfer box have been transferred to the boat, a material loading process ends. If all the wafers in the wafer transfer box have not been transferred to the boat, the STR transfers a selected wafer transfer box to the load lock chamber. The WTR transfers all wafers in the wafer transfer box in the load lock chamber to the boat of the PM. The STR transfers the wafer transfer box back to the original position in the stocker. As such, the material loading process ends.

Figure 4:
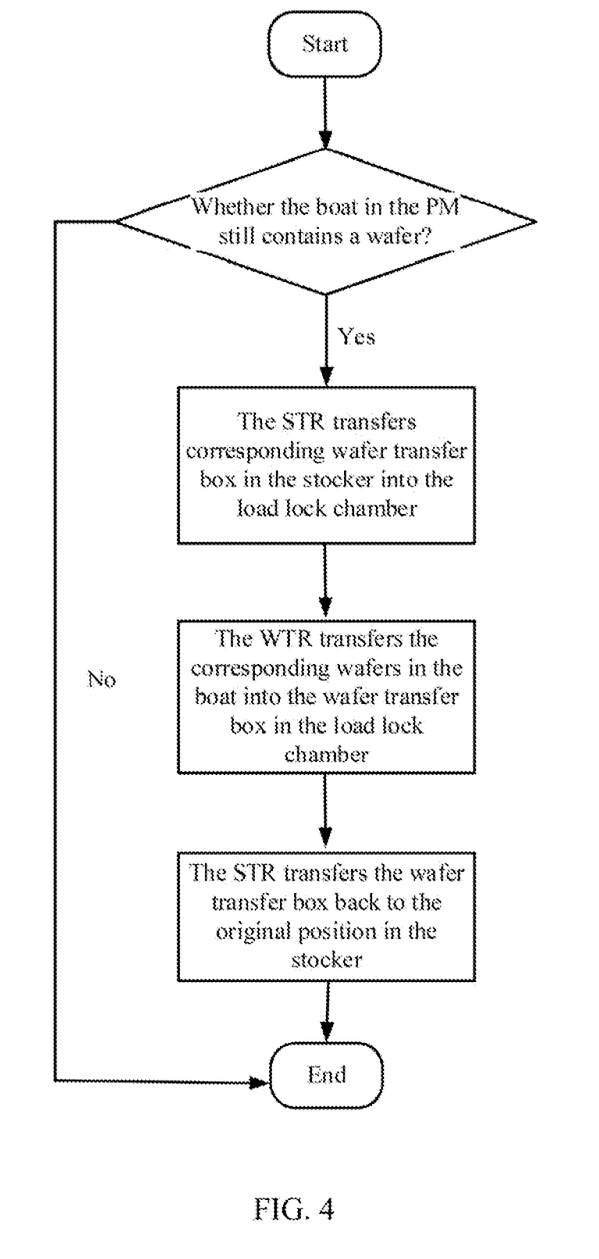
FIG. 4 is a schematic diagram showing a material unloading process applied to a vertical furnace apparatus according to some embodiments of the present disclosure.

FIG. 4 is a schematic diagram showing a material unloading process applied to the vertical furnace apparatus according to some embodiments of the present disclosure. After the process starts, whether the boat in the PM still contains a wafer may be first determined. If the boat in the PM does not contain a wafer, a material unloading process ends. If the boat in the PM still contains a wafer, the STR transfers the corresponding wafer transfer box into the load lock chamber. The WTR transfers the corresponding wafers on the boat into the wafer transfer box in the load lock chamber. The STR transfers the wafer transfer box back to the original position in the stocker. In this manner, the material unloading process ends.

Figure 5:
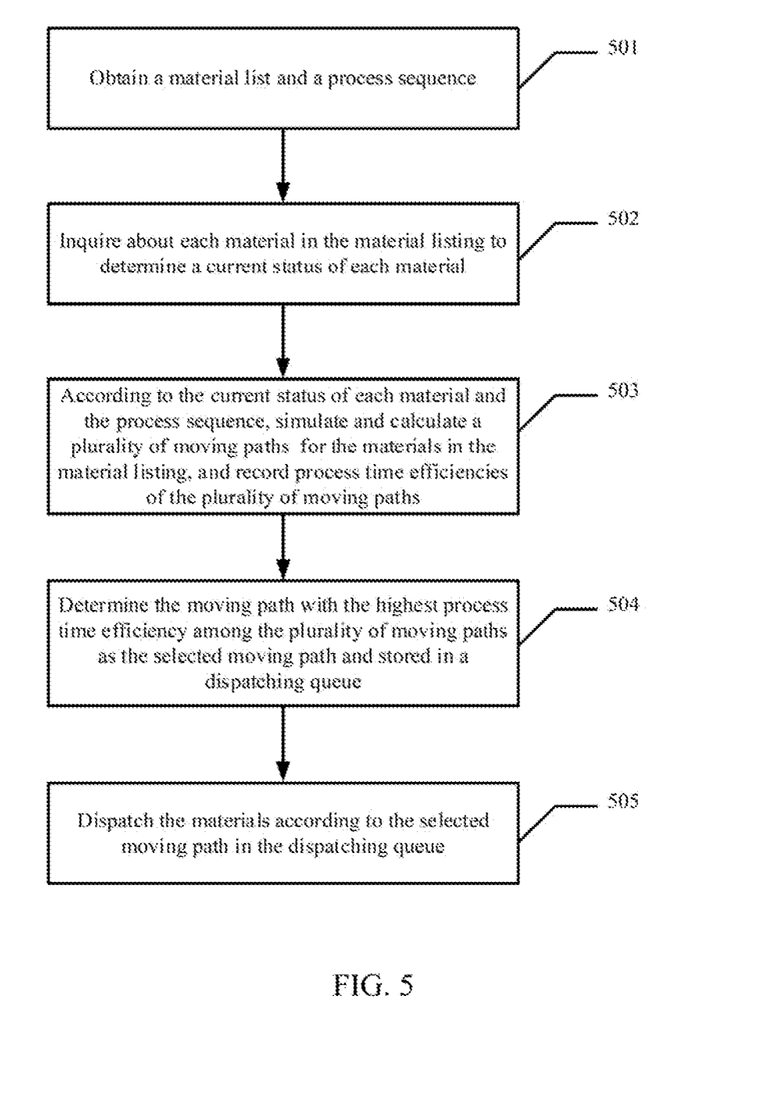
FIG. 5 is a schematic flowchart showing a method of a material dispatching according to some embodiments of the present disclosure.

FIG. 5 is a schematic flowchart showing the method of the material dispatching according to some embodiments of the present disclosure. The method includes the following processes.

At 501, a material listing and a process sequence are obtained.

The material may include all the materials that can be dispatched. The dispatchable materials may include the wafer and the wafer transfer box. The process sequence may refer to an order of processes that needs to be performed on the wafer and a sequence of into which process chamber the wafer needs to enter correspondingly. The material listing may list all the dispatchable materials and current statuses of the dispatchable materials in the entire process system. For example, for the vertical furnace apparatus, since the entire process system may not only transfer the wafers but also transfer the wafer transfer boxes, to adapt to a plurality of dispatchable objects, transferring information of the wafers and the wafer transfer boxes may need to be summarized and included in the material listing. In some embodiments, if other dispatchable objects exist, the other dispatchable objects may be added to the material listing.

At 502, each material (including the wafers, the wafer transfer boxes, etc.) in the material listing is inquired about to determine a current status of each material.

The current status of each material may include whether the material is in a movable status at the current time point or in a moving priority status at the current time point. For example, the wafers which are processed in the process chamber may be in an immovable status.

At 503, according to the current status of each material and the process sequence, a plurality of moving paths may be simulated and calculated for the materials in the material listing, and process time efficiencies of the plurality of moving paths may be recorded. As used herein, the term "process time efficiency" is associated with a time length as the materials travel along a moving path. The shorter the time length is, the higher the process time efficiency is.

Each moving path is a collection of the moving sequences of the materials in the moving path on a line of time. The moving sequence on a line of time means to move multiple steps in a time sequence.

While each moving path of the materials is simulated and calculated, each time as a process of each moving path advances for one step means that one of the materials moves for one time. The material may include a wafer, or a wafer transfer box. Moreover, any one moving step of the same moving path may include the movement of the wafer, or the movement of the wafer transfer box. For example, the material of a certain step of the moving path may include a wafer, and the material of the next step of the moving path may include a wafer or a wafer transfer box. On the contrary, the material of a step of the moving path may include a wafer transfer box, and the material of the next step of the moving path may include a wafer or a wafer transfer box.

At 504, the moving path with the highest process time efficiency among the plurality of moving paths is determined as the selected moving path and stored in a dispatching queue.

At 505, the materials are dispatched according to the selected moving path in the dispatching queue.

Therefore, the selected dispatching of the materials in a complex system may be realized, which may save process time and increase process yield In some embodiments, in process 503, simulating and calculating the plurality of moving paths of the materials includes the following exemplary steps.

At 5031, a start point and a search depth are set for each moving patch of the plurality of moving paths.

The search depth may include a predetermined total number of steps as the moving path advances.

At 5032, any one of the plurality moving paths (e.g., the current traversed moving path) is traversed until the search depth is reached, and the traversing time of the any one of the plurality moving paths is calculated.

At 5033, whether an untraversed moving path exists is determined, if an untraversed moving path exists, the process returns to the start point and traverses one of the untraversed moving paths until the search depth is reached, and calculates the traversing time of the one of the untraversed moving paths; if an untraversed moving path does not exist, the simulating and the calculating of the plurality of moving paths ends.

In some embodiments, in the process 5032, each time the process of each moving path advances for one step, the current status of each material is updated in real-time, and the latest current status of each material is stored in the material listing. As such, the next step of the moving path may be selected according to the current latest status of each material.

Figure 6:
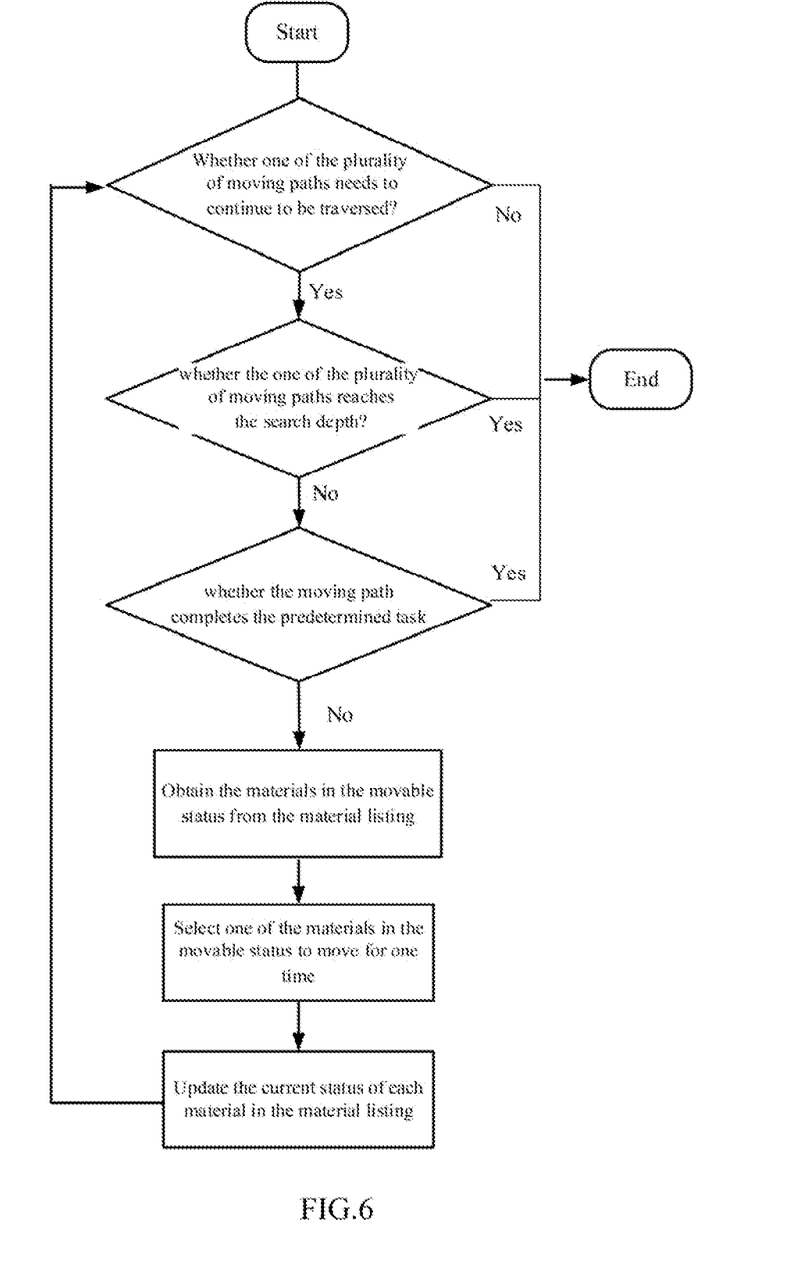
FIG. 6 is a schematic flowchart for traversing a moving path according to some embodiments of the present invention.

FIG. 6 is a schematic flowchart for traversing a moving path according to some embodiments of the present disclosure. As shown in FIG. 6, the method includes the following exemplary steps.

Whether one of the plurality of moving paths needs to continue to be traversed is determined.

If the one of the plurality of moving paths does not need to continue to be traversed, the one of the plurality of moving paths ends.

If the one of the plurality of moving paths needs to continue to be traversed, whether the one of the plurality of moving paths reaches the search depth is determined.

If the search depth is reached, the one of the plurality of moving paths ends.

If the search depth is not reached, whether the moving path completes the predetermined task is determined, that is, whether the wafer reaches the predetermined position.

If the predetermined task is completed, the one of the plurality of moving paths ends.

If the predetermined task is not completed, the materials (e.g., the wafers and the wafer transfer boxes) in the movable status from the material listing are obtained, and one of the materials in the movable status is selected to move for one time. The current status (e.g., movable status and/or moving priority status) of each material in the material listing is updated, and the traversing process returns to determine whether one of the plurality of moving paths needs to continue to be traversed. Therefore, a moving path traversing process is completed.

In some embodiments, the above flow shown in FIG. 6 may be repeatedly performed a plurality of times to complete the traversing process for the plurality of moving paths, and the process time efficiencies of the plurality of moving paths may be recorded. As such, the moving path with the highest process time efficiency may be selected as the selected moving path.

Figure 7:
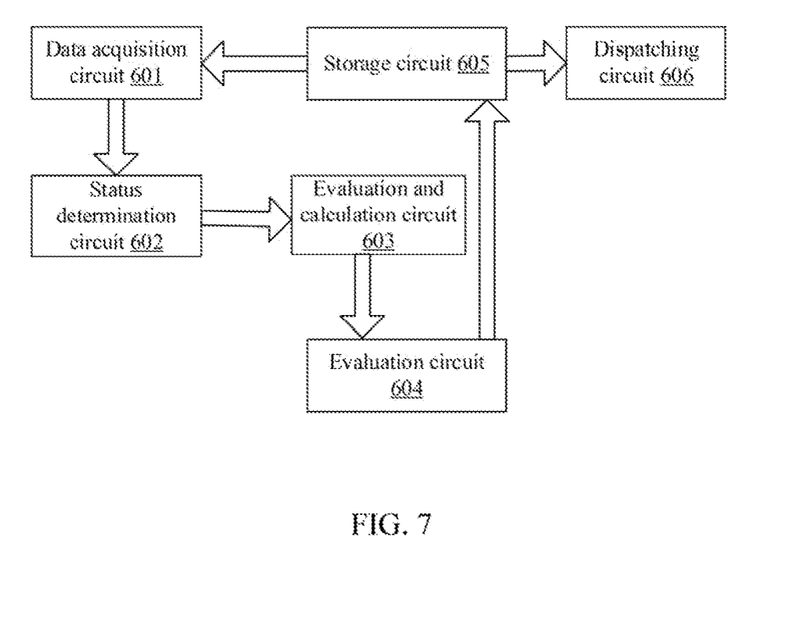
FIG. 7 is a schematic diagram of an apparatus for material dispatching according to some embodiments of the present disclosure.

FIG. 7 is a schematic diagram of an apparatus for the material dispatching according to some embodiments of the present disclosure. As shown in FIG. 7, the apparatus for the material dispatching includes a data acquisition circuit 601, a status determination circuit 602, a simulation and calculation circuit 603, an evaluation circuit 604, a storage circuit 605, and a dispatching circuit 606.

In some embodiments, the data acquisition circuit 601 may be configured to obtain a material listing and a process sequence from the storage circuit 605, and provide the material listing to the status determination circuit 602. The status determination circuit 602 may be configured to inquire about each material in the material listing to determine the current status of each material, and provide the current status of each material and the process sequence to the simulation and calculation circuit 603. The simulation and calculation circuit 603 may be configured to simulate and calculate the plurality of moving paths of the materials, record the process time efficiencies of the plurality of moving paths according to the current status of each material and the process sequence, and provide the process time efficiencies to the evaluation circuit 604. The evaluation circuit 604 may be configured to use the moving path with the highest process time efficiency as the selected moving path and provide the selected moving path to the storage circuit 605. The storage circuit 605 may be configured to store the material listing and the process sequence and save the selected moving path in the dispatching queue. The dispatching circuit 606 may be configured to obtain the dispatching queue from the storage circuit 605, and dispatch the materials according to the selected moving path in the dispatching queue. As such, the selected dispatching of the materials in the complex system may be realized, which may save the process time and increase the process yield.

According to another aspect of the present disclosure, embodiments of the present disclosure provide a vertical furnace apparatus including the apparatus for the material dispatching provided by embodiments of the present disclosure.

The vertical furnace apparatus consistent with embodiments of the present disclosure may realize the selected dispatching of the materials in the complex system by using the apparatus for the material dispatching provided by embodiments of the present disclosure. As such, the process time may be saved, and the process yield may be increased.

The above solution is merely a specific solution showing the concept of the present disclosure. The present disclosure is not limited to the solution. A portion of the processing of the solution may be omitted or skipped without departing from the spirit and scope of the present disclosure.

The present disclosure is not limited to the above embodiments. The present disclosure may include one or multiple parts or operations without departing from the spirit and scope of the present disclosure or omit or skip one or multiple parts or operations.

The present disclosure has been illustrated above in connection with embodiments of the present disclosure. However, those skilled in the art may understand that various modifications, replacements, and changes may be made to the present disclosure without departing from the spirit and scope of the disclosure. Therefore, the present disclosure should not be limited by embodiments of the present disclosure but should be defined by the appended claims and their equivalents.

What is claimed is:

1. A method for dispatching a material comprising:
obtaining a material listing and a process sequence required by a system, the material including a wafer and a wafer transfer box, the process sequence indicating processes for the wafer and process chambers that the wafer needs to enter, and the material listing indicating all wafers, all wafer transfer boxes, current statuses of all the wafers, and current statuses of all the wafer transfer boxes in the system;
inquiring about each material in the material listing to determine a current status of each material, the current status of each material including a status indicating whether the material is able to move or a moving sequence status of the material at a current time point;
according to the current statuses of all the wafer transfer boxes and the current statuses and the process sequence of all the wafers corresponding to all the wafer transfer boxes, calculating a moving path of each wafer transfer box;
according to the current statuses and the process sequence of all the wafers, calculating a moving path of each wafer;
according to the moving path of each wafer transfer box and the moving path of each wafer, comparing and calculating moving paths of the materials, the moving paths of the materials including a collection of moving sequences of the materials on a line of time;
rating the moving paths of the materials according to process time efficiencies of the moving paths of the materials, and using a moving path with a highest process time efficiency among the moving paths as a selected moving path and storing the selected moving path in a dispatching queue; and
dispatching the material, according to the selected moving path in the dispatching queue;
wherein according to the current status of each material and the process sequence, simulating and calculating the plurality of moving paths for the materials includes:
setting a start point and a search depth for each moving path of the plurality of moving paths;
traversing any one of the plurality of moving paths until reaching the search depth and calculating a traversing time of the any one of the plurality of moving paths; and
returning to the start point and traversing one of the untraversed moving paths until reaching the search depth and calculating a traversing time of the one of the untraversed moving paths; and
repeating the above steps to traverse the plurality of moving paths until reaching the search depth and calculating traversing times of the plurality of moving paths.

2. The method of claim 1, wherein when comparing and calculating the moving paths of the materials, each time as a process of each moving path advances for one step, moving one of the materials for one time.

3. The method of claim 1, further comprising during traversing the plurality of moving paths, each time as a process of each moving path advances for one step, updating the current status of each material in real-time, and storing a latest current status of each material in the material listing for a next step selection of the plurality of moving path.

4. The method of claim 1, wherein the search depth includes a predetermined total number of steps as the moving path advances.

5. The method of claim 4, wherein when the material is a wafer, a finger attribute of a manipulator is used to adjust a number of wafers for one time fetching and placing.

6. An apparatus for material dispatching comprising:

a data acquisition circuit, configured to obtain a material listing and a process sequence, the material including a wafer and a wafer transfer box, the process sequence indicating processes for the wafer and process chambers that the wafer needs to enter, and the material listing indicating all wafers, all wafer transfer boxes, current statuses of all the wafers, and current statuses of all the wafer transfer boxes in the system;

a status determination circuit configured to inquire about each material in the material listing to determine a current status of each material, the current status of each material including a status indicating whether the material is able to move or a moving sequence status of the material at a current time point;

a simulation and calculation circuit configured to, according to the current statuses of all the wafer transfer boxes and the current statuses and the process sequence of all the wafers corresponding to all the wafer transfer boxes calculate a moving path of each wafer transfer box, according to the current statuses and the process sequence of all the wafers, calculate a moving path of each wafer, and according to the moving path of each wafer transfer box and the moving path of each wafer, simulate and calculate moving path of the materials, the moving paths of the materials including a collection of moving sequences of the materials on a line of time;

an evaluation circuit configured to evaluate the moving paths of the materials according to process time efficiencies of the moving paths of the materials, and use a moving path with a highest process time efficiency among the moving paths as a selected moving path; and a storage circuit configured to store the material listing and the process sequence to store the selected moving path in a dispatching queue; and a dispatching circuit configured to dispatch the material according to the selected moving path in the dispatching queue;

wherein simulating and calculating the plurality of moving paths for the materials includes:

setting a start point and a search depth for each moving path of the plurality of moving paths;

traversing any one of the plurality of moving paths until reaching the search depth and calculating a traversing time of the any one of the plurality of moving paths; and returning to the start point and traversing one of the untraversed moving paths until reaching the search depth and calculating a traversing time of the one of the untraversed moving paths; and repeating the above steps to traverse the plurality of moving paths until reaching the search depth and calculating traversing times of the plurality of moving paths.

7. The apparatus of claim 6, wherein the storage circuit is configured to, during traversing the plurality of moving paths, each time as a process of each moving path advances for one step, update the current status of each material in real-time, and store a latest current status of each material in the material listing for a next step selection of the plurality of moving path.

* * * * *